United States Patent
Song et al.

(10) Patent No.: US 12,530,833 B2
(45) Date of Patent: Jan. 20, 2026

(54) ORAL IMAGE PROCESSING DEVICE AND ORAL IMAGE PROCESSING METHOD

(71) Applicant: MEDIT CORP., Seoul (KR)

(72) Inventors: Myoung Woo Song, Seoul (KR); Ha Jong Nam, Seoul (KR)

(73) Assignee: MEDIT CORP., Seoul (KR)

( * ) Notice: Subject to any disclaimer, the term of this patent is extended or adjusted under 35 U.S.C. 154(b) by 330 days.

(21) Appl. No.: 18/027,689

(22) PCT Filed: Sep. 8, 2021

(86) PCT No.: PCT/KR2021/012215
§ 371 (c)(1),
(2) Date: Mar. 22, 2023

(87) PCT Pub. No.: WO2022/065756
PCT Pub. Date: Mar. 31, 2022

(65) Prior Publication Data
US 2023/0386119 A1    Nov. 30, 2023

(30) Foreign Application Priority Data

Sep. 23, 2020  (KR) .......... 10-2020-0123323

(51) Int. Cl.
*G06T 15/00* (2011.01)
*A61C 9/00* (2006.01)
(Continued)

(52) U.S. Cl.
CPC ............ *G06T 15/00* (2013.01); *A61C 9/0053* (2013.01); *G06T 7/194* (2017.01); *G06T 7/40* (2013.01);
(Continued)

(58) Field of Classification Search
CPC ........... G06T 15/00; G06T 7/194; G06T 7/40; G06T 2207/20132; G06T 2207/30036;
(Continued)

(56) References Cited

U.S. PATENT DOCUMENTS

2011/0255765 A1  10/2011  Carlson et al.
2013/0110469 A1   5/2013  Kopelman
(Continued)

FOREIGN PATENT DOCUMENTS

CN      102741880 A    10/2012
CN      113543742 A    10/2021
(Continued)

OTHER PUBLICATIONS

Magdalena Kasparova, et al., "Intra-Oral 3D Scanning for the Digital Evaluation of Dental Arch Parameters", Applied Sciences, 2018, pp. 1-9, vol. 8, thesis No. 1838.
(Continued)

*Primary Examiner* — Jitesh Patel
(74) *Attorney, Agent, or Firm* — Sughrue Mion, PLLC

(57) ABSTRACT

Provided are an intraoral image processing method and an intraoral image processing apparatus. The intraoral image processing method includes obtaining three-dimensional (3D) intraoral data of a scanned object; creating a 3D intraoral image including a scanned surface area and a rear surface area of the scanned surface area, based on the 3D intraoral data; and deleting at least a portion of the rear surface area.

18 Claims, 12 Drawing Sheets

(51) Int. Cl.
*G06T 7/194* (2017.01)
*G06T 7/40* (2017.01)

(52) U.S. Cl.
CPC ............ *G06T 2207/20132* (2013.01); *G06T 2207/30036* (2013.01); *G06T 2215/16* (2013.01)

(58) Field of Classification Search
CPC ............ G06T 2215/16; G06T 2210/41; G06T 2219/2021; G06T 19/20; A61C 9/0053; A61C 9/004; A61B 5/0062; A61B 2576/02; A61B 5/0088
See application file for complete search history.

(56) References Cited

U.S. PATENT DOCUMENTS

| | | | |
|---|---|---|---|
| 2016/0256035 A1 | 9/2016 | Kopelman et al. | |
| 2019/0159868 A1 | 5/2019 | Chen et al. | |
| 2020/0265653 A1 | 8/2020 | Hawkins et al. | |
| 2020/0349698 A1* | 11/2020 | Minchenkov | G06T 17/00 |
| 2020/0405456 A1* | 12/2020 | Nikolskiy | A61B 6/032 |
| 2021/0401550 A1 | 12/2021 | Chang et al. | |
| 2022/0168074 A1* | 6/2022 | Bogdanic | A61C 9/0053 |
| 2022/0198686 A1* | 6/2022 | Kim | A61B 6/032 |

FOREIGN PATENT DOCUMENTS

| | | |
|---|---|---|
| CN | 118175973 A | 6/2024 |
| JP | 2019-51206 A | 4/2019 |
| KR | 10-2013-0019676 A | 2/2013 |
| KR | 10-1730696 B1 | 4/2017 |
| KR | 10-1875755 B1 | 8/2018 |
| KR | 10-2019-0084344 A | 7/2019 |
| KR | 10-2020-0109273 A | 9/2020 |
| WO | 2011/021099 A2 | 2/2011 |
| WO | 2020/185527 A1 | 9/2020 |

OTHER PUBLICATIONS

Korean Office Action for Korean Application No. 10-2020-0123323 dated Apr. 18, 2022, 8 pages.
Korean Notice of Allowance Office Action for Korean Application No. 10-2020-0123323 dated Oct. 18, 2022, 9 pages.
International Search Report for PCT/KR2021/012215 dated Dec. 15, 2021.
Extended European Search Report issued Sep. 25, 2024 in application No. 21872786.5.
Chinese Office Action dated Aug. 27, 2025 in Application No. 202180064465.1.

* cited by examiner

ORAL IMAGE PROCESSING DEVICE AND ORAL IMAGE PROCESSING METHOD

CROSS REFERENCE TO RELATED APPLICATIONS

This application is a National Stage of International Application No. PCT/KR2021/012215 filed Sep. 8, 2021, claiming priority based on Korean Patent Application No. 10-2020-0123323 filed Sep. 23, 2020.

TECHNICAL FIELD

The present disclosure relates to intraoral image processing apparatuses and intraoral image processing methods, and more specifically, to an intraoral image processing apparatus and method capable of accurately and easily deleting unnecessary data measured during teeth measurement.

BACKGROUND ART

Recently, a method of obtaining an intraoral image by inserting an intraoral scanner into a patient's oral cavity has been used to obtain intraoral information about the patient. By scanning the oral cavity of a patient by using an intraoral scanner, three-dimensional (3D) data about an object such as the patient's teeth, gums, and jawbone may be obtained, and the obtained 3D data may be used for the treatment or correction of teeth. When the oral cavity of a patient is scanned using an intraoral scanner, unnecessary data (noise data) such as a tongue, cheeks around teeth, or a dentist's finger may be measured in addition to data regarding the teeth.

When a user arbitrarily selects and deletes unnecessary data on a display, a portion of tooth data adjacent to the unnecessary data may be lost during deletion of the unnecessary data. In this case, an intraoral scan must be performed again to obtain the lost tooth data. Alternatively, the portion of the unnecessary data may remain without being deleted. Accordingly, a technique of accurately deleting unnecessary data from obtained oral data is required.

DISCLOSURE

Technical Problem

Provided are an intraoral image processing method for identifying unnecessary data from obtained intraoral data and accurately and easily deleting only the identified unnecessary data, and an apparatus for performing operations of the intraoral image processing method.

Technical Solution

According to an aspect of the present disclosure, an intraoral image processing method includes obtaining three-dimensional (3D) intraoral data of a scanned object, creating a 3D intraoral image including a scanned surface area and a rear surface area of the scanned surface area, based on the 3D intraoral data, and deleting at least a portion of the rear surface area.

The 3D intraoral data may include vertex data, and the deleting of the at least a portion of the rear surface may include, based on an angle between a direction vector of vertex data of a first area included in the rear surface area and a normal vector of a virtual reference surface being in a preset range, deleting the first area.

The deleting of the at least a portion of the rear surface may further include changing the virtual reference surface by a preset direction, and, based on an angle between a direction vector of vertex data of a second area included in the rear surface area and a normal vector of a changed virtual reference surface being in a preset range, deleting the second area.

The preset range may be no less than 90 degrees to no less than 180 degrees.

The intraoral image processing method may further include displaying the 3D intraoral image on a screen, and the displaying of the 3D intraoral image on the screen may include displaying the 3D intraoral image on the screen, based on at least one of a viewpoint indicating a direction in which the 3D intraoral image is observed and a screen on which the 3D intraoral image is projected in a two-dimensional (2D) manner.

The intraoral image processing method may further include setting a deletion area on the 3D intraoral image. The 3D intraoral data may include vertex data, the displaying of the 3D intraoral image on the screen may include, based on an angle between a direction vector of vertex data of a first area in the 3D intraoral image and a normal vector of the screen being in a preset range, displaying the first area as the rear surface area, and the deleting of the at least a portion of the rear surface area may include deleting the rear surface area included in the deleted area.

The intraoral image processing method may further include displaying at least one of an item corresponding to a deletion function and an icon for selecting the deletion area.

The displaying of the item corresponding to the deletion function and the icon for selecting the deletion area may include, in response to a user input of selecting the item corresponding to the deletion function, displaying the icon for selecting the deletion area, and displaying at least one size setting icon for setting the size of the icon for selecting the deletion area.

The setting of the deletion area on the 3D intraoral image may include receiving a user input of moving the icon for selecting the deletion area, and setting, as the deletion area, an area which the icon for selecting the deletion area has passed.

The displaying of the 3D intraoral image on the screen may include displaying the scanned surface area in a first color and displaying the rear surface area in a second color that is distinct from the first color.

The displaying of the 3D intraoral image on the screen may include determining a texture of the scanned surface area, based on the 3D intraoral data, and displaying the scanned surface area to have the determined texture.

The deleting of the at least a portion of the rear surface area may further include deleting at least a portion of the rear surface area spaced apart from the scanned surface area.

The intraoral image processing method may further include segmenting the intraoral image into a tooth area and a gingival area. The deleting of the at least a portion of the rear surface area may include deleting at least a portion of the rear surface area included in the tooth area and not deleting at least a portion of the rear surface area included in the gingival area.

According to an aspect of the present disclosure, an intraoral image processing apparatus includes a display, a memory storing one or more instructions, and a processor. The processor may execute the one or more instructions stored in the memory to obtain 3D intraoral data by scanning an object, create a 3D intraoral image including a scanned surface area and a rear surface area of the scanned surface area, based on the 3D intraoral data, and delete at least a portion of the rear surface area.

Advantageous Effects

In an intraoral image processing apparatus and an intraoral image processing method according to an embodiment, noise data adjacent to teeth may be identified from obtained intraoral data, and only the identified noise data may be accurately and easily deleted.

Accordingly, there is no need for a user to manually check noise data on a display and arbitrarily delete the noise data, and there is no need to re-scan the oral cavity to obtain tooth data lost during removal of the noise data, leading to an increase in user convenience.

DESCRIPTION OF DRAWINGS

The disclosure may be readily understood by reference to the following detailed description and the accompanying drawings, in which reference numerals refer to structural elements.

MODE FOR INVENTION

Figure 1:
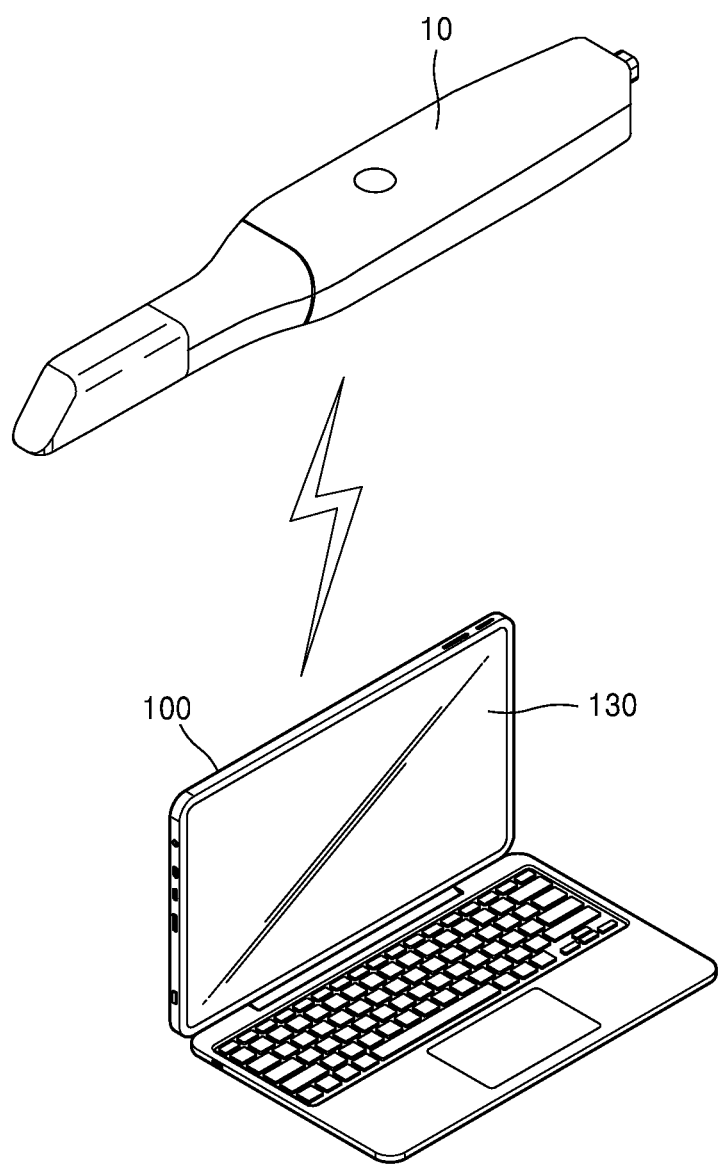
FIG. 1 is a view for explaining an intraoral image processing system according to an embodiment.

The principle of the present invention is explained and embodiments are disclosed so that the scope of the present invention is clarified and one of ordinary skill in the art to which the present invention pertai1ns implements the present invention. The disclosed embodiments may have various forms.

Throughout the specification, like reference numerals or characters refer to like elements. In the present specification, all elements of embodiments are not explained, but general matters in the technical field of the present invention or redundant matters between embodiments will not be described. The terms 'part' and 'portion' used herein may be implemented using software or hardware, and, according to embodiments, a plurality of 'parts' or 'portions' may be implemented using a single unit or element, or a single 'part' or 'portion' may be implemented using a plurality of units or elements. The operational principle of the present invention and embodiments thereof will now be described more fully with reference to the accompanying drawings.

An image used herein may include an image representing at least one tooth or an oral cavity including at least one tooth (hereinafter, an 'intraoral image').

The image used herein may be a two-dimensional (2D) image of a target object, or a three-dimensional (3D) model or 3D image representing the target object in a 3D manner. The image used herein may indicate data required to two-dimensionally or three-dimensionally represent an object, for example, raw data obtained from at least one image sensor. In detail, the raw data is obtained to create an intraoral image, and may be data (for example, 2D data) obtained from at least one image sensor included in an intraoral scanner when a patient's oral cavity, which is an object, is scanned using the intraoral scanner.

An object used herein may include a tooth, a gingiva, at least a portion of an oral cavity, and/or an artificial structure insertable into the oral cavity (for example, an orthodontic device, an implant, an artificial tooth, or an orthodontic support member inserted into the oral cavity), and a tooth model (for example, a plaster model or an impression model). The orthodontic device may include at least one of a bracket, an attachment, an orthodontic screw, a lingual orthodontic device, and a removable orthodontic support device.

Embodiments now will be described more fully hereinafter with reference to the accompanying drawings.

FIG. 1 is a view for explaining an intraoral image processing system according to an embodiment.

Referring to FIG. 1, the intraoral image processing system includes an intraoral scanner 10 and an intraoral image processing apparatus 100.

The intraoral scanner 10 according to an embodiment is a medical device for obtaining an image of the inside of an oral cavity. In detail, the intraoral scanner 10 may be a device that is inserted into the oral cavity and scan teeth in a non-contact manner t obtain an image of the oral cavity including at least one tooth. The intraoral scanner 10 may have a shape that may be inserted into and withdrawn from an oral cavity, and may scan the inside of the oral cavity of a patient by using at least one image sensor (for example, an optical camera). The intraoral scanner 10 may obtain surface information on an object as raw data in order to image a surface of at least one of a tooth model, a tooth inside the oral cavity, a gingiva, and an artificial structure insertable into the oral cavity (for example, an orthodontic device including a bracket and a wire, an implant, an artificial tooth, or an orthodontic support member inserted into the oral cavity), which are objects.

Image data obtained by the intraoral scanner 10 may be transmitted to the intraoral image processing apparatus 100 connected through a wired or wireless communication network.

The intraoral image processing apparatus 100 may refer to any electronic device that may be connected to the intraoral scanner 10 through a wired or wireless communication network, may receive a 2D image obtained by scanning the oral cavity from the intraoral scanner 10, and may generate, process, display, and/or transmit an intraoral image, based on the received 2D image.

Based on 2D image data received from the intraoral scanner 10, the intraoral image processing apparatus 100 may process the 2D image data to create information, or process the 2D image data to create an intraoral image. The intraoral image processing apparatus 100 may display the created information and the created intraoral image through a display 130.

The intraoral image processing apparatus 100 may be, but is not limited to, a computing device, such as a smartphone, a laptop computer, a desktop computer, a personal digital assist (PDA), or a tablet personal computer (PC).

The intraoral image processing apparatus 100 may also exist in the form of a server (or a server device) for processing an intraoral image.

The intraoral scanner 10 may transmit the raw data obtained through an intraoral scan operation to the intraoral image processing apparatus 100 without changes. In this case, the intraoral image processing apparatus 100 may create a 3D intraoral image three-dimensionally representing the oral cavity, based on the received raw data. The intraoral image processing apparatus 100 according to an embodiment may create 3D data (e.g., surface data) representing the shape of the surface of an object in a 3D manner, based on the received raw data.

3D surface data according to an embodiment may be in the form of a point cloud, and the point cloud may include a plurality of points. Each of the plurality of points includes a direction vector. The 3D surface data will be described in detail with reference to FIG. 2.

Because the '3D intraoral image' may be created by three-dimensionally modeling an internal structure of the oral cavity based on the received raw data, the 3D intraoral image may be referred to as a '3D intraoral model' or a '3D intraoral image'. Hereinafter, a model or image representing the oral cavity in a 2D or 3D manner will be collectively referred to as an 'intraoral image'.

The intraoral image processing apparatus 100 may analyze, process, and display a created intraoral image and/or transmit the created intraoral image to an external device.

As another example, the intraoral scanner 10 may obtain the raw data through an intraoral scan operation, may process the obtained raw data to create an image corresponding to the oral cavity, which is an object, and may transmit the created image to the intraoral image processing apparatus 100. In this case, the intraoral image processing apparatus 100 may analyze, process, display, and/or transmit the received image.

According to an embodiment, the intraoral image processing apparatus 100 is an electronic device capable of generating and displaying an intraoral image representing an oral cavity including one or more teeth in a 3D manner, and will be described in detail below.

Figure 2:
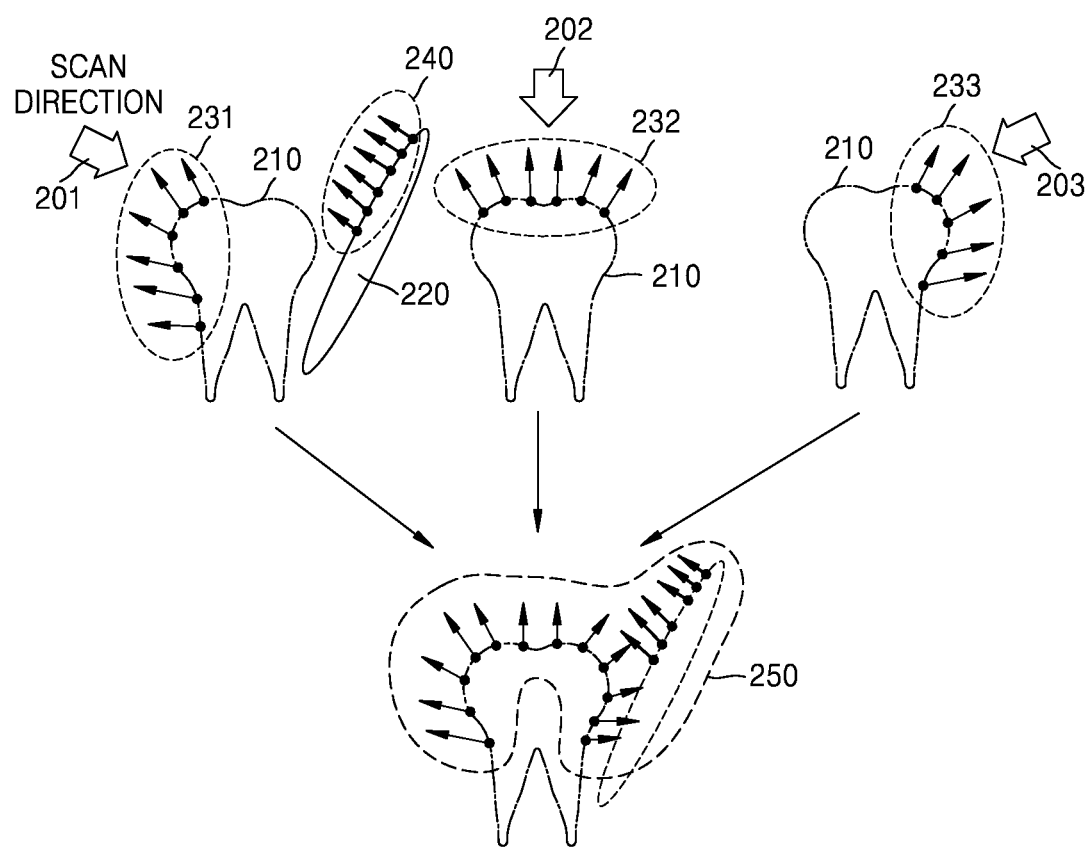
FIG. 2 is a view used to explain an operation of obtaining three-dimensional (3D) intraoral data, according to an embodiment.

FIG. 2 is a view used to explain an operation of obtaining 3D intraoral data, according to an embodiment.

For example, 3D intraoral data may be obtained by scanning an oral cavity and/or a tooth model by using the intraoral scanner 10 described with reference to FIG. 1. When at least one tooth is scanned in a process of obtaining intraoral data, soft tissues such as lips, cheeks, tongue, and a dentist's finger may be scanned together with the teeth because they come into close contact with the teeth.

For convenience of description, FIG. 2 illustrates an example in which a noise material 220 (material to be deleted) is scanned together based on one tooth 210, but embodiments are not limited thereto. When the inside of a mouth and/or a tooth model are scanned using the intraoral scanner 10, a noise material other than the tooth 210 may be scanned together. The noise material may be a target material to be deleted.

Referring to FIG. 2, the intraoral scanner 10 according to an embodiment may scan the tooth 210 in various directions in order to scan all surfaces of the tooth 210, for example, the inside of the oral cavity. For example, the intraoral scanner 10 may scan the tooth 210 while moving so that the tooth surfaces, such as the front, top, and rear surfaces of the tooth 210, are entirely scanned.

When the intraoral scanner 10 scans the tooth 210 in a first direction 201, the noise material 220 adjacent to the back of the tooth 210, for example, the lips, a finger, tongue, cheek attached to a tooth, and a dentist's finger) may be scanned together with the front surface of the tooth 210. In this case, the intraoral image processing apparatus 100 may obtain 3D data 231 about the front surface of the tooth 210 and 3D data 240 (hereinafter, referred to as 'noise data') about the front surface of a portion of the noise material 220.

3D data according to an embodiment may be in the form of a point cloud representing the surface of an object. The point cloud may include a plurality of points, and the plurality of points may represent location information of the surface of the object. For example, the 3D data 231 about the tooth surface may represent location information about the front surface of the tooth 210. Each of the plurality of points may include a direction vector, and the direction vector of the point may be determined based on normal vectors of surfaces adjacent to the point, but embodiments are not limited thereto. In this case, the surfaces adjacent to the point may refer to surfaces including the point.

When the intraoral scanner 10 scans a tooth in a second direction 202, the intraoral image processing apparatus 100 may obtain 3D data 232 about the upper surface of the tooth 210, and, when the intraoral scanner 10 scans the tooth 210 in a third direction 203, the intraoral image processing apparatus 100 may obtain 3D data 233 about the rear surface of the tooth 210. When the intraoral scanner 10 scans the tooth 210 in the second direction 202 and the third direction 203, the noise material 220 may not be scanned. For example, when the noise material 220 is a cheek adjacent to a tooth and the front surface of the tooth is scanned, because a scan direction of the intraoral scanner 10 and a surface direction of the cheek face each other, the surface of the cheek may be scanned together. However, when the upper surface or rear surface of the tooth is scanned, because the scan direction of the intraoral scanner 10 and the surface direction of the cheek do not face each other, the surface of the cheek may not be scanned. Typically, in the case of a noise material, 3D data is not obtained in all directions, like in the case of teeth.

When the tooth 210 is scanned in various directions and thus 3D data 250 is obtained, the intraoral image processing apparatus 100 may create and display an intraoral image, based on the 3D data 250. This will be described in greater detail below with reference to FIG. 3.

Figure 3A:
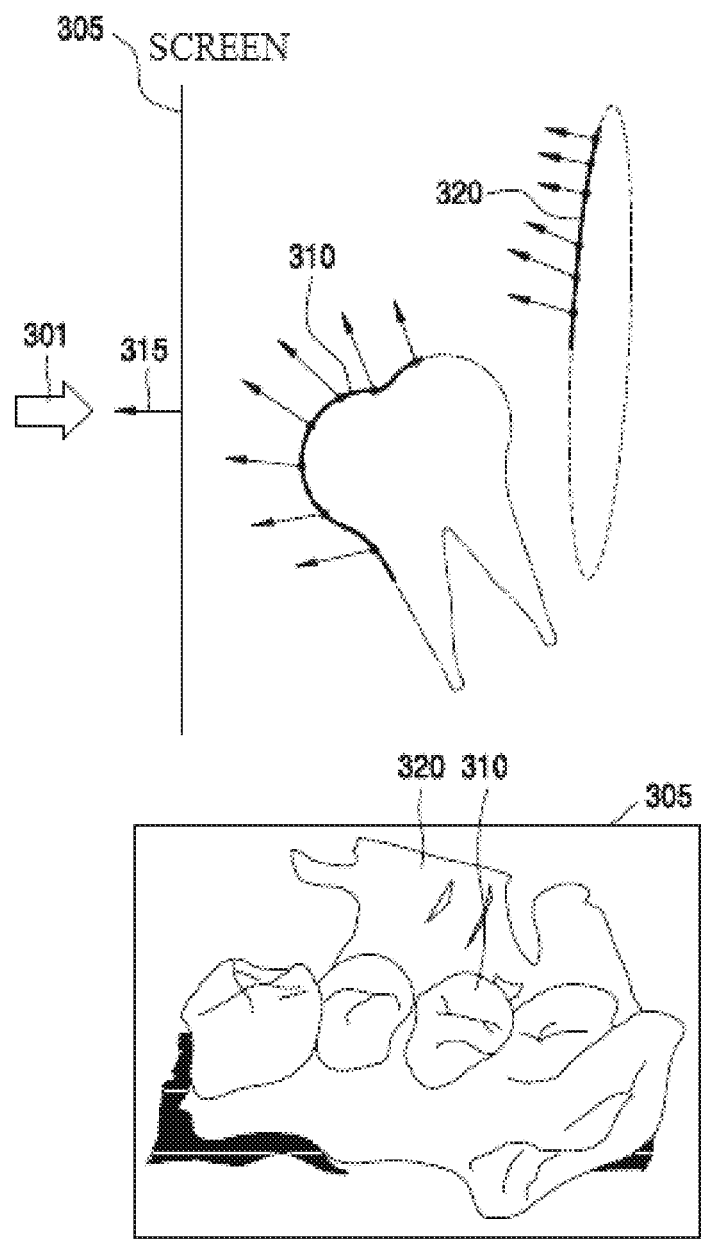
FIGS. 3A and 3B are views used to explain an operation, performed by an intraoral image processing apparatus, of displaying an intraoral image, according to an embodiment.
Figure 3B:
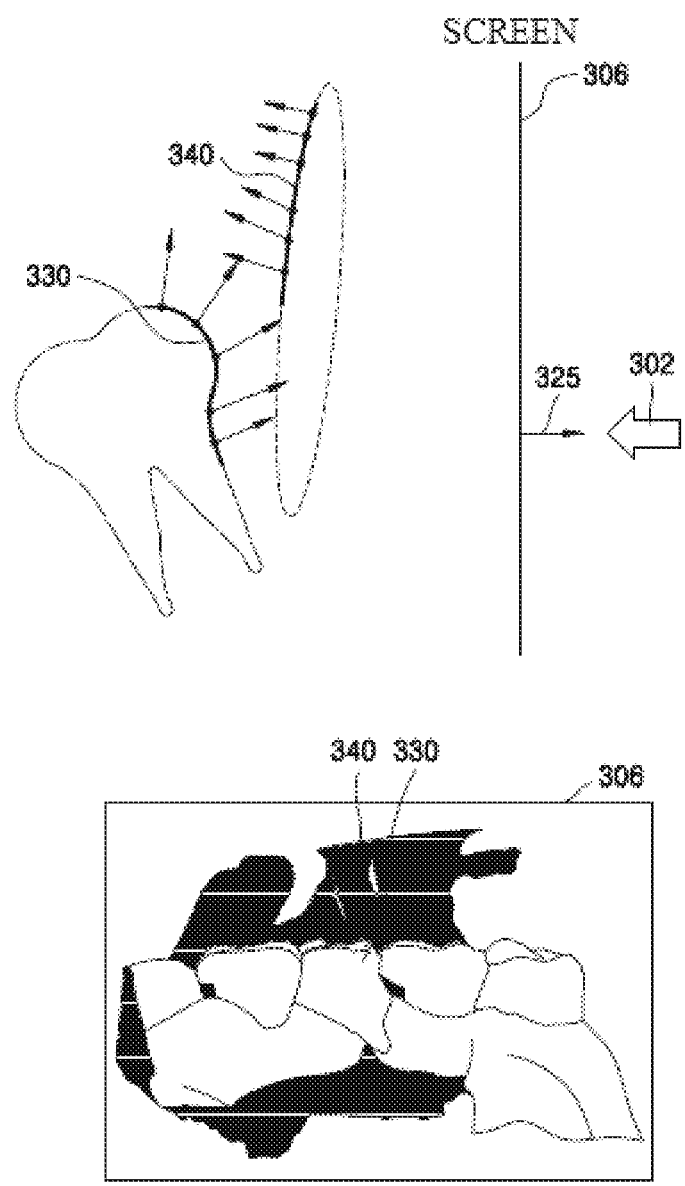

FIGS. 3A and 3B are views used to explain an operation, performed by an intraoral image processing apparatus, of displaying an intraoral image, according to an embodiment.

The intraoral image processing apparatus 100 according to an embodiment may create a 3D intraoral image, based on obtained 3D data. A 3D intraoral image according to an embodiment may be an image representing the surface of an object.

The intraoral image processing apparatus 100 according to an embodiment may display a 3D intraoral image on 2D screens 305 and 306. The intraoral image processing apparatus 100 may determine screens according to viewpoints 301 and 302. The viewpoints 301 and 302 indicate directions in which an observer (user) observes a 3D intraoral image, and the screens 305 and 306 indicate projection planes on which the 3D intraoral image is projected based on the viewpoints 301 and 302. The screens 305 and 306 according to an embodiment may be screens of the display 130 of the intraoral image processing apparatus 100 of FIG. 1.

In the 3D intraoral image according to an embodiment, a surface scanned by the intraoral scanner 10 and a surface not scanned by the intraoral scanner 10 (rear surface of the scanned surface) may be distinguished from each other and displayed. For example, the surface scanned by the intraoral scanner 10 and the surface not scanned by the intraoral scanner 10 (rear surface of the scanned surface) may be distinguished from each other using colors. However, embodiments are not limited to this distinguishing method.

For example, when the 3D intraoral image is displayed on the screens 305 and 306 and an angle between the direction vectors of first points included in the intraoral data and normal vectors 315 and 325 of the screens 305 and 306 is in a first range, the intraoral image processing apparatus 100 may determine, as the scanned surface, a surface on which the first points are located. In this case, the first range may be greater than or equal to 0 degrees and less than 90 degrees. However, the first range is not limited thereto, and may be determined as various angles.

On the other hand, when an angle between the direction vectors of second points included in the intraoral data and the normal vectors 315 and 325 of the screens 305 and 306 is in a second range, the intraoral image processing apparatus 100 may determine a surface on which the second points are located, as the rear surface of the scanned surface (not-scanned surface). In this case, the second range may be no less than 90 degrees and no more than 180 degrees, but embodiments are not limited thereto. The second range may be determined as various angles.

In addition to the methods described above, the scanned surface and the unscanned surface may be distinguished from each other in various ways.

For example, FIG. 3A shows a case in which a 3D intraoral image observed from a first viewpoint 301 is displayed on a first screen 305.

Referring to FIG. 3A, when the intraoral image processing apparatus 100 displays the 3D intraoral image on the first screen 305, because an angle between a direction vector of points corresponding to the first surface 310 and the normal vector 315 of the first screen 305 has a first range (e.g., 0 degrees or more and less than 90 degrees), the intraoral image processing apparatus 100 may display the first surface 310 as a scanned surface on the first screen 305. Because an angle between a direction vector of points corresponding to the second surface 320 and the normal vector 315 of the first screen 305 also has the first range (e.g., 0 degrees or more and less than 90 degrees), the intraoral image processing apparatus 100 may display the second surface 320 as a scanned surface on the first screen 305.

FIG. 3B shows a case in which a 3D intraoral image observed from a second viewpoint 302 is displayed on a second screen 306.

Referring to FIG. 3B, when the intraoral image processing apparatus 100 displays the 3D intraoral image on the second screen 306, because an angle between a direction vector of points corresponding to a third surface 330 and the normal vector 325 of the second screen 306 has the first range (e.g., 0 degrees or more and less than 90 degrees), the intraoral image processing apparatus 100 may display the third surface 330 as a scanned surface on the second screen 306. Because an angle between a direction vector of points corresponding to a fourth surface 340 and the normal vector 325 of the second screen 306 has a second range (e.g., no less than 90 degrees and no more than 180 degrees), the intraoral image processing apparatus 100 may display the fourth surface 340 as an unscanned surface on the second screen 306.

The intraoral image processing apparatus 100 may distinguish and display the scanned surface and the unscanned surface from each other. For example, the surface scanned by the intraoral scanner 10 may be displayed in a first color mapped based on obtained 3D data (e.g., point cloud data), and the surface not scanned by the intraoral scanner 10 may be displayed in a second color (e.g., black) because 3D data has not been obtained. However, a method of distinguishably displaying a scanned surface and a non-scanned surface is not limited thereto. In a 3D intraoral image according to an example, a scanned surface and a non-scanned surface may not be distinguished from each other on a screen (or visually).

Referring to FIG. 3A, the intraoral image processing apparatus 100 may display the first surface 310 and the second surface 320 in a first color on the first screen 305. For example, the intraoral image processing apparatus 100 may determine respective colors and/or textures of the first surface 310 and the second surface 320 according to location information and/or a direction vector of the points corresponding to the first surface 310 and the second surface 320, and may display the first surface 310 and the second surface 320 in the determined colors and/or textures.

Referring to FIG. 3B, the intraoral image processing apparatus 100 may display the third surface 330 in a first color on the screen 306. For example, the intraoral image processing apparatus 100 may determine a color and/or texture of the third surface 330 according to location information and/or a direction vector of the points corresponding to the third surface 330, and may display the third surface 330 in the determined color and/or texture.

The intraoral image processing apparatus 100 may display the fourth surface 340 in a second color on the screen 306. For example, the intraoral image processing apparatus 100 may display the fourth surface 340 in black. However, embodiments are not limited thereto.

FIGS. 4A through 4E are views used to explain an operation, performed by an intraoral image processing apparatus, of deleting noise data, according to an embodiment.

Figure 4A:
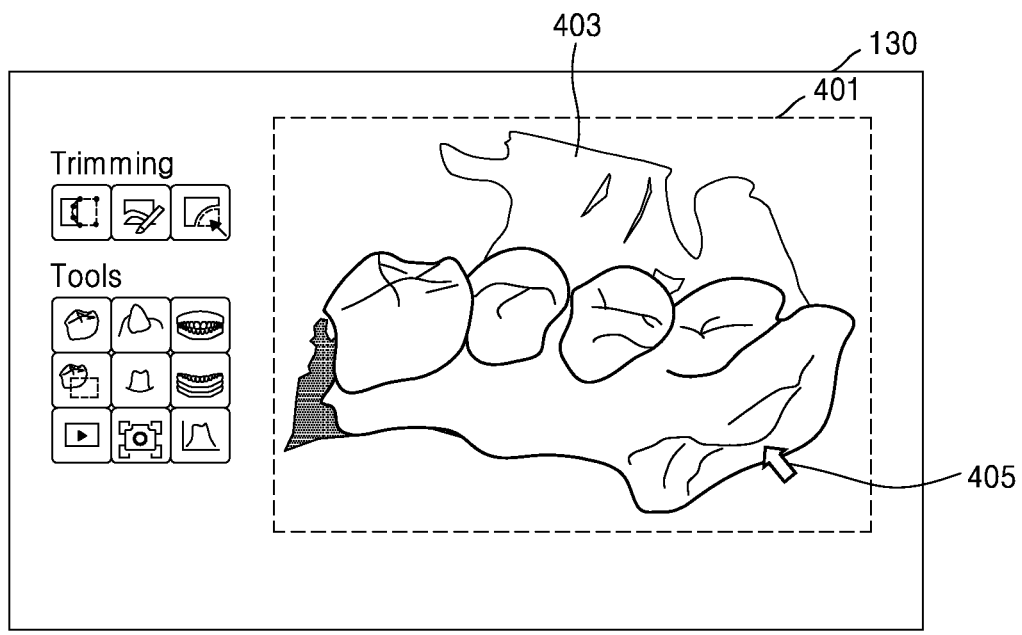
FIGS. 4A through 4E are views used to explain an operation, performed by an intraoral image processing apparatus, of deleting noise data, according to an embodiment.

Referring to FIG. 4A, the intraoral image processing apparatus 100 according to an embodiment may display a 3D intraoral image on a 2D display screen. A user of an intraoral image processing apparatus may search for a screen from which data to be deleted (for example, noise data) is to be deleted, while changing a viewpoint for the 3D intraoral image. The intraoral image processing apparatus 100 may rotate the 3D intraoral image and display the rotated 3D intraoral image on a screen, based on a user input.

For example, as shown in FIG. 4A, when a first intraoral image 401 and a cursor 405 corresponding to a first viewpoint are displayed on the screen and an input of dragging the cursor 405 is received, the intraoral image processing apparatus 100 may rotate and display a 3D intraoral image in a dragging direction.

Figure 4B:
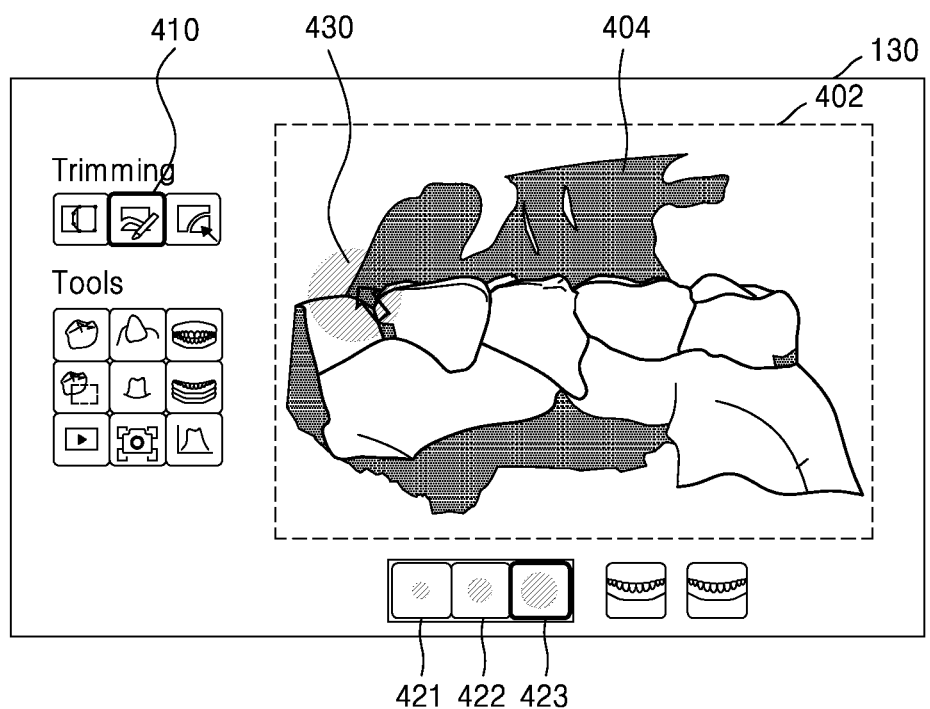

For example, in response to an input of dragging the cursor 405 in one direction of the screen, the intraoral image processing apparatus 100 may display a second intraoral image 402 corresponding to a changed second viewpoint, as shown in FIG. 4B. The second intraoral image 402 shown in FIG. 4B may be a rear surface of the first intraoral image 401 shown in FIG. 4A.

In this case, the second intraoral image 402 may include a surface area scanned by the intraoral scanner 10 and a rear area of the scanned surface area. For example, the scanned surface area may be displayed in the first color, and the rear area of the scanned surface area may be displayed in the second color (e.g., black). The scanned surface area and the rear area of the scanned surface area may be distinguished from each other in various ways, and may not be distinguished from each other on screen. For example, a first surface area 403 of FIG. 4A is displayed in the first color on the first intraoral image 401, but a rear surface area 404 of the first surface area appears on a second intraoral image 402 of FIG. 4B, and thus the rear surface area 404 of the first surface area may be displayed in the second color.

The intraoral image processing apparatus 100 according to an embodiment may display menus for editing or changing an intraoral image on the screen, together with the intraoral image. Referring to FIG. 4B, the intraoral image processing apparatus 100 according to an embodiment may display a first item 410 corresponding to a noise data deletion function from among the displayed menus. In response to a user input for selecting the first item 410, the intraoral image processing apparatus 100 may display a brush icon 430 for selecting an area to be deleted, and second items 421, 422, and 423 for selecting sizes of a brush icon. When any one of the second items 421, 422, and 423 is selected, the intraoral image processing apparatus 100 may change the size of the brush icon 430 to a selected size.

Figure 4C:
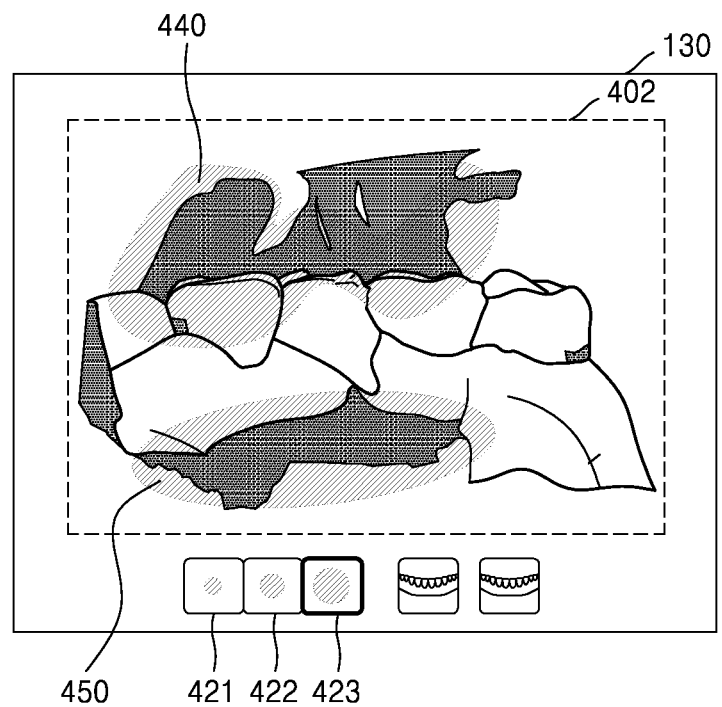

Referring to FIG. 4C, the intraoral image processing apparatus 100 may select an area 440 from which noise data is to be deleted, based on a user input for moving the brush icon 430, and may delete the noise included in the selected area 440.

Figure 4D:
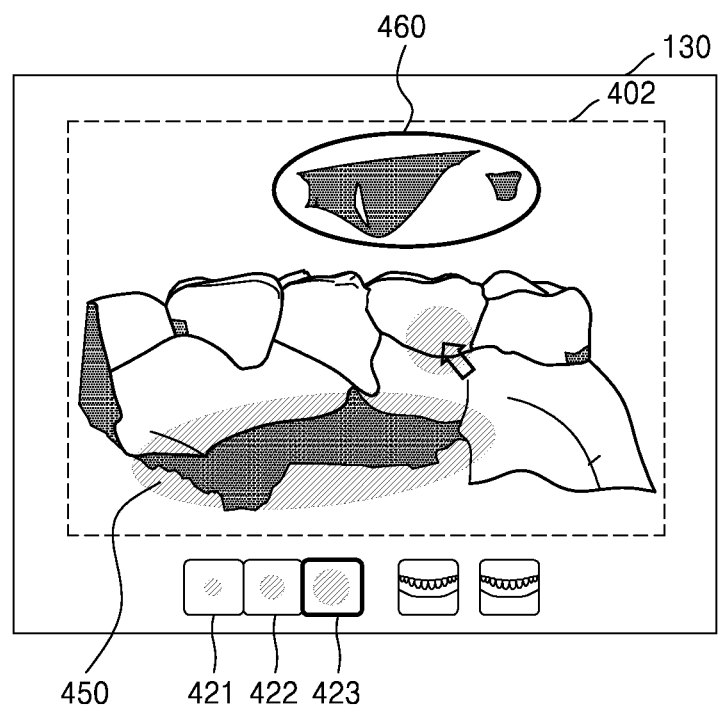

Referring to FIG. 4D, the intraoral image processing apparatus 100 according to an embodiment may delete only a portion marked with a second color (e.g., black) from the selected area 440 of FIG. 4C, and may not delete a portion marked with the first color. The portion marked with the second color represents the surface not scanned by the intraoral scanner 10 (rear surface of the surface scanned by the intraoral scanner 10). For example, the intraoral image processing apparatus 100 may not delete the surface area scanned by the intraoral scanner 10 among the surfaces included in the second intraoral image 402 (surfaces observed from the second viewpoint), and may delete only the rear area of the surface scanned by the intraoral scanner 10.

As described above with reference to FIG. 2, when an object is a tooth, the surface of the tooth may be scanned in all directions, and thus the scanned surface may be displayed even when a viewpoint is changed. However, in the case of a noise material, the surface of the noise material is not scanned in all directions, and thus, when a direction in which the surface is not scanned is used as a viewpoint, an unscanned surface of the noise material (rear surface of the scanned surface) is displayed. Accordingly, when an unscanned surface (rear surface of a scanned surface) is displayed on a screen, the unscanned surface may be determined as the surface of a noise material rather than a tooth.

Accordingly, the intraoral image processing apparatus 100 may delete only the portion displayed in the second color from the selected area 440 of FIG. 4C, and thus may delete only noise data without deleting intraoral data.

Referring back to FIG. 4C, the intraoral image processing apparatus 100 according to an embodiment may select an area 450 from which noise data is to be deleted, based on the user input for moving the brush icon 430. The intraoral image processing apparatus 100 may segment a 3D intraoral image into a tooth area and a gingival area, and, when the selected area 450 is included in the gingival area, may not delete the rear surface of the scanned surface (portion marked with the second color), as shown in FIG. 4D. For example, in the case of a gingiva located in a direction opposite to the viewpoint of a currently displayed screen, a portion of the rear surface area of the gingiva is displayed on the screen, and the rear area of the gingiva is displayed in the second color. Accordingly, when the noise data deletion function is applied to the gingival area, the gingival rear area may be deleted. Thus, the intraoral image processing apparatus 100 according to an embodiment may not apply the noise data deletion function to the gingival area.

Referring to FIG. 4D, after the noise data included in the selected area 440 is deleted, noise data 460 separated from the tooth may remain in the second intraoral image 402. For example, an area 460 displayed in the second color separated from an area displayed in the first color by a predetermined distance or more may exist in the second intraoral image 402.

Figure 4E:
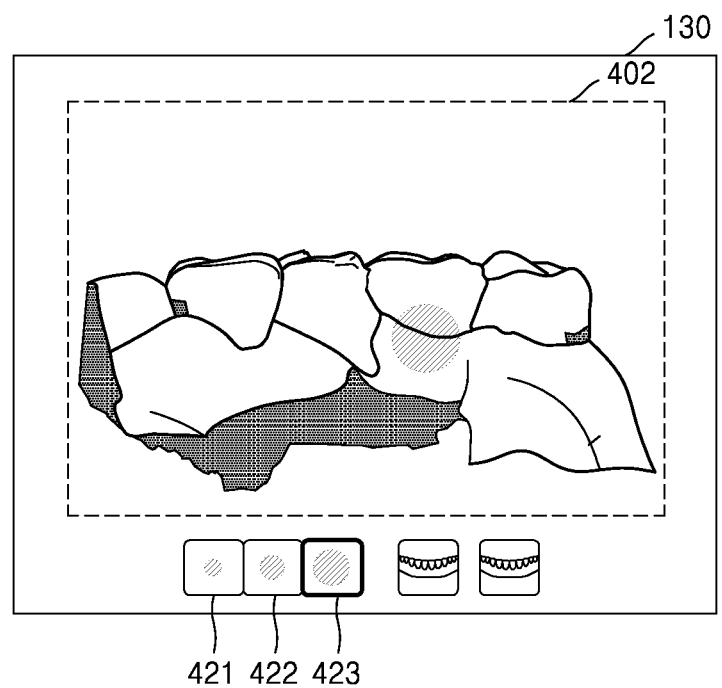

Referring to FIG. 4E, the intraoral image processing apparatus 100 may delete the area 460 (noise data) displayed in the second color of FIG. 4D automatically or based on a user input. Accordingly, the intraoral image processing apparatus 100 according to an embodiment may accurately and easily delete noise data adjacent to tooth data by using a noise data deletion function.

Figure 5:
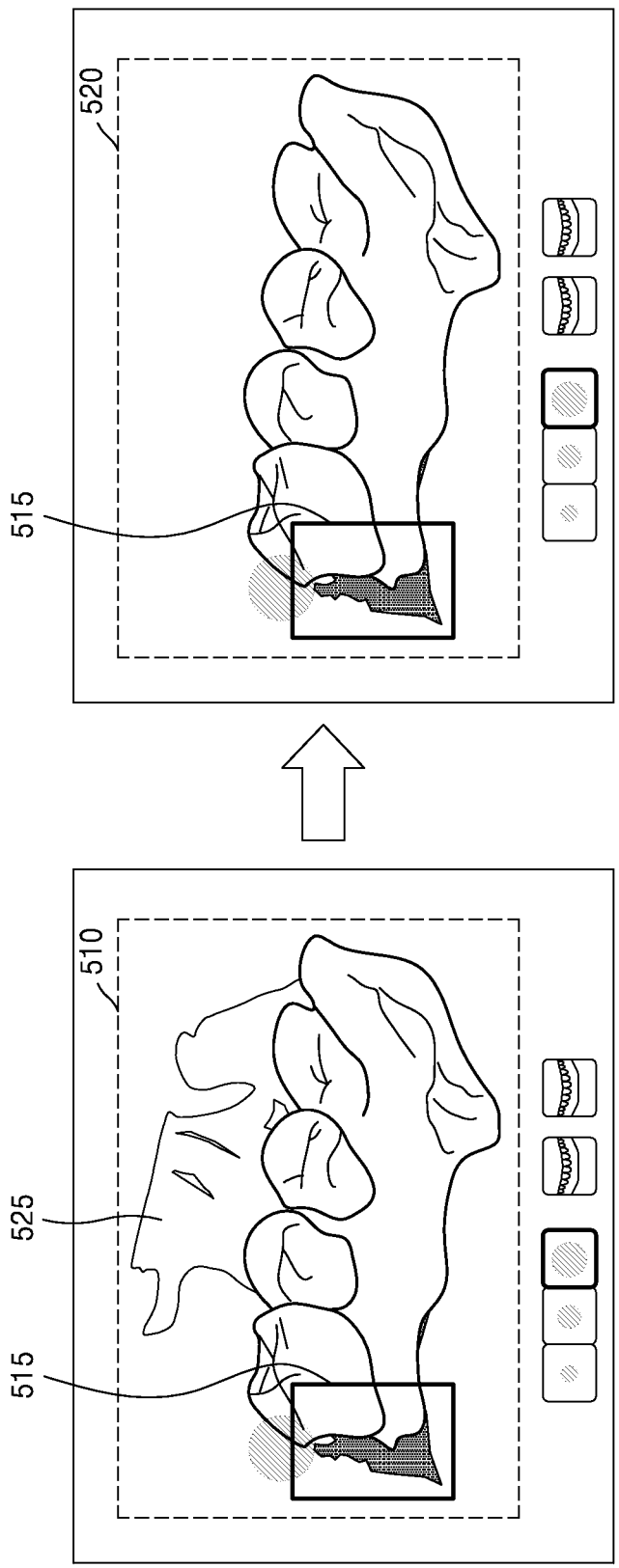
FIG. 5 is a view used to explain an operation, performed by an intraoral image processing apparatus, of automatically deleting noise data, according to an embodiment.

FIG. 5 is a view used to explain an operation, performed by an intraoral image processing apparatus, of automatically deleting noise data, according to an embodiment.

The intraoral image processing apparatus 100 according to an embodiment may perform an automatic noise deletion function.

For example, as shown in FIG. 5, when the 3D intraoral image 510 is displayed and an automatic noise data deletion function is selected by a user input, the intraoral image processing apparatus 100 may delete at least a portion of a rear surface area included in a 3D intraoral image while automatically changing the location of a virtual reference surface.

The 3D intraoral image according to an embodiment may include a scanned surface area and a rear area (unscanned surface area) of the scanned surface area.

When an angle between a direction vector of the vertex data of a first area included in the rear surface area and a normal vector of the virtual reference surface is in a preset range, the intraoral image processing apparatus 100 may delete the first area. The intraoral image processing apparatus 100 may change the virtual reference surface by a preset direction, and, when an angle between the normal vector of the virtual reference surface whose position has been changed and the direction vector of the vertex data of a second area included in the rear surface area is in a preset range, may delete the second area.

For example, when the entire surface of a tooth is scanned (when 3D data is obtained in several directions), the tooth is displayed as only a scanned surface on the 3D intraoral image, and tooth data is not deleted.

However, in the case of a noise material, 3D data is not obtained in several directions, and thus 3D data for the noise material is displayed as a scanned surface and a rear area of the scanned surface on a 3D intraoral image. When the automatic noise deletion function is applied, while the location of the virtual reference surface is being changed, and the rear surface area included in the 3D intraoral image is deleted. Therefore, when the automatic noise deletion function is applied to the intraoral image 510 according to an embodiment, 3D data 525 for the noise material is deleted.

In an intraoral image according to an embodiment, because the entire surface of the patient's oral cavity is imaged, one or more teeth and the gingiva surrounding the teeth are also imaged. In this case, when the gingiva is located in an opposite direction to the normal vector of the virtual reference surface, a gingival rear surface area 515 may be included in a 3D intraoral image. Accordingly, when the noise data deletion function is applied to the gingival area, the gingival rear surface area 515 may be deleted. Therefore, the intraoral image processing apparatus 100 according to an embodiment may segment the 3D intraoral image into a tooth area and a gingival area and apply a noise deletion function only to the tooth area, thereby preventing deletion of the gingival rear surface area 515.

When the automatic noise deletion function is completed, the intraoral image processing apparatus 100 according to an embodiment may display, on a screen, an intraoral image from which noise data 525 has been deleted.

Figure 6:
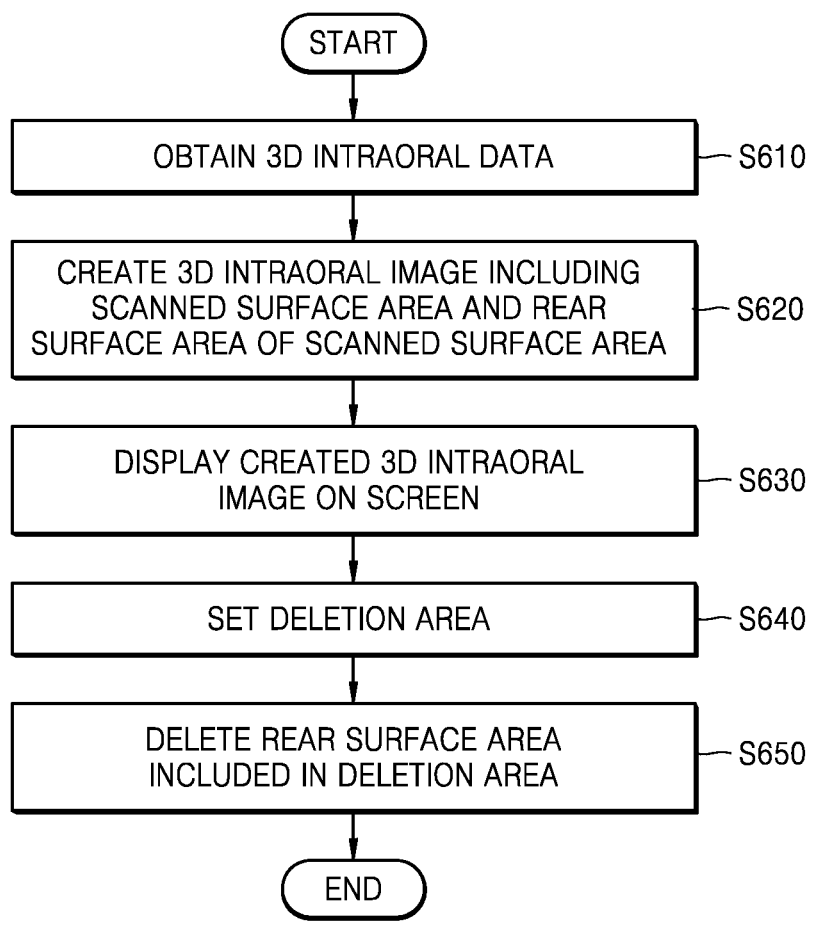
FIG. 6 is a flowchart of an intraoral image processing method according to an embodiment.

FIG. 6 is a flowchart of an intraoral image processing method according to an embodiment.

Referring to FIG. 6, the intraoral image processing apparatus 100 according to an embodiment may obtain 3D intraoral data (S610).

When an oral cavity and/or a tooth model are scanned using the intraoral scanner 10, the intraoral image processing apparatus 100 according to an embodiment may obtain 3D intraoral data. At this time, in order to scan all surfaces of a tooth, the tooth may be scanned in various directions.

3D intraoral data according to an embodiment may be in the form of a point cloud representing the surface of an object. The point cloud may include a plurality of points, and the plurality of points may represent location information of the surface of the object. An operation of obtaining 3D intraoral data has been described above in detail with reference to FIG. 2, and thus a repeated description thereof will be omitted.

The intraoral image processing apparatus 100 may create a 3D intraoral image including a scanned surface area and a rear surface area of the scanned surface area (S620).

For example, the intraoral image processing apparatus 100 may create a 3D intraoral image so that the scanned surface area and the rear surface area of the scanned surface area include distinguished colors. Alternatively, the intraoral image processing apparatus 100 may create a 3D intraoral image so that the scanned surface area includes texture and the rear surface area of the scanned surface area does not include texture. However, embodiments are not limited thereto.

The intraoral image processing apparatus 100 according to an embodiment may display the created 3D intraoral image on a screen (S630).

The intraoral image processing apparatus 100 may display the 3D intraoral image on a 2D screen. For example, the intraoral image processing apparatus 100 may display the 3D intraoral image on the screen, based on a viewpoint and a screen indicating a direction in which the 3D intraoral image is observed.

The intraoral image processing apparatus 100 may display the scanned surface area on the 3D intraoral image in a first color mapped based on the obtained 3D data. The scanned surface area may include texture. The intraoral image processing apparatus 100 may display the rear surface area of the scanned surface area in a second color (e.g., black).

The intraoral image processing apparatus 100 according to an embodiment may set a deletion area on the 3D image displayed on the screen (S640).

For example, the intraoral image processing apparatus 100 may display an item corresponding to a noise data deletion function, and, in response to a user input of selecting an item, may display an icon for setting an area from which noise data is to be deleted (deletion area). The intraoral image processing apparatus 100 may set a noise area on the intraoral image, based on a user input of moving an icon. However, embodiments are not limited thereto, and the intraoral image processing apparatus 100 may set a deletion area by using various user interfaces.

The intraoral image processing apparatus 100 according to an embodiment may delete a rear surface area from the deletion area (S650).

For example, the intraoral image processing apparatus 100 may delete only the rear surface area displayed in the second color from the noise area, and may not delete the scanned surface area displayed in the first color.

The intraoral image processing apparatus 100 may segment the 3D intraoral image into a tooth area and a gingival area, and may delete only a rear surface area included in the tooth area from a noise area and may not delete a rear surface area included in the gingival area.

The intraoral image processing apparatus 100 may delete a rear surface area (area displayed in a second color) spaced apart from the scanned surface area (area displayed in a first color) by a predetermined distance or more.

The intraoral image processing apparatus 100 according to an embodiment may delete a rear surface area included in the 3D intraoral image, by performing an automatic noise deletion function without a user input for setting a deletion area. For example, the intraoral image processing apparatus 100 may automatically set a virtual reference surface, and may delete at least a portion of the rear surface area included in the 3D intraoral image while changing the position of the virtual reference surface. When an angle between a direction vector of the vertex data of a first area included in the rear surface area and a normal vector of the virtual reference surface is in a preset range, the intraoral image processing apparatus 100 may delete the first area. The intraoral image processing apparatus 100 may change the virtual reference surface by a preset direction, and, when an angle between the normal vector of the virtual reference surface whose position has been changed and the direction vector of the vertex data of a second area included in the rear surface area is in a preset range, may delete the second area.

At this time, the intraoral image processing apparatus 100 may not delete a rear surface area included in the gingival area by segmenting the 3D intraoral image into a tooth area and a gingival area and apply a noise deletion function only to the tooth area.

Figure 7:
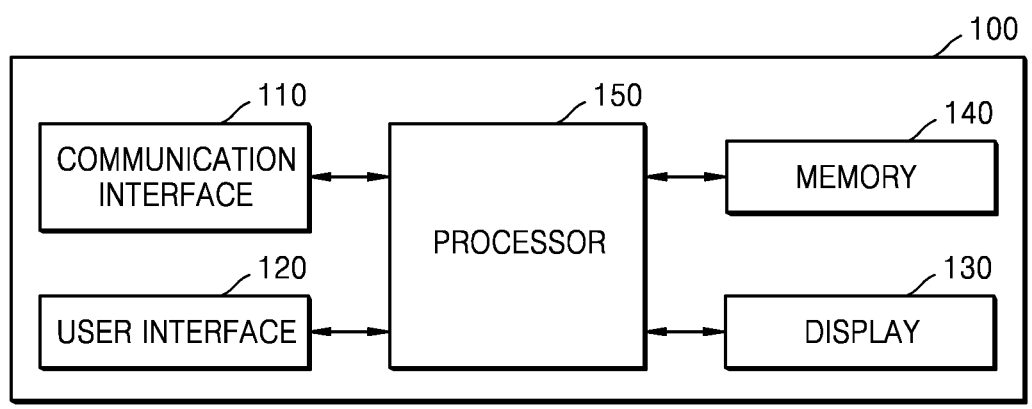
FIG. 7 is a block diagram of an intraoral image processing apparatus according to an embodiment.

FIG. 7 is a block diagram of an intraoral image processing apparatus according to an embodiment.

The intraoral image processing method of FIG. 6 may be performed by the intraoral image processing apparatus 100. Thus, the intraoral image processing method of FIG. 6 may be a flowchart illustrating operations of the intraoral image processing apparatus 100.

Referring to FIG. 7, the intraoral image processing apparatus 100 may include a communication interface 110, a user interface 120, a display 130, a memory 140, and a processor 150.

The communication interface 110 may perform communication with at least one external electronic device (e.g., the intraoral scanner 10, a server, or an external medical device) through a wired or wireless communication network. The communication interface 110 may perform data communication with the at least one electronic device under a control by the processor 150.

In detail, the communication interface 110 may include at least one short-range communication module that performs communication according to a communication standard such as Bluetooth, Wi-Fi, Bluetooth Low Energy (BLE), NFC/RFID, Wi-Fi Direct, UWB, or ZIGBEE.

The communication interface 110 may further include a long-distance communication module for performing communication with a server for supporting long-distance communication according to a long-distance communication standard. In detail, the communication interface 110 may include a long-distance communication module for performing communication via a network for Internet communication. The communication interface 110 may include a long-distance communication module for performing communication via a communication network following a communication standard such as 3G, 4G, and/or 5G.

The communication interface 110 may also include at least one port for connection to an external electronic device (e.g., an intraoral scanner) through a wired cable in order to communicate with the external electronic device by wire. Accordingly, the communication interface 110 may perform communication with the external electronic device connected by wire through the at least one port.

The user interface 120 may receive a user input for controlling the intraoral image processing apparatus 100. The user interface 120 may include, but is not limited to, a user input device including a touch panel for sensing a user's touch, a button for receiving a user's push operation, a mouse for specifying or selecting one point on a user interface screen, or a keyboard.

The user interface 120 may include a voice recognition device for voice recognition. For example, the voice recognition device may be a microphone, and the voice recognition device may receive a user's voice command or voice request. Accordingly, the processor 150 may control an operation corresponding to the voice command or voice request to be performed.

The display 130 displays a screen. In detail, the display 130 may display a predetermined screen under a control by the processor 150. In detail, the display 130 may display a user interface screen including an intraoral image created based on data obtained by scanning a patient's oral cavity by the intraoral scanner 10. Alternatively, the display 130 may display a user interface screen including information related to the patient's dental treatment.

The memory 140 may store at least one instruction. The memory 140 may store at least one instruction that the processor 150 executes. The memory 140 may also store at least one program that the processor 150 executes. The memory 140 may store data received from the intraoral scanner 10 (e.g., raw data obtained through intraoral scanning). Alternatively, the memory 140 may store an intraoral image three-dimensionally representing the oral cavity. The memory 140 according to an embodiment may store one or more instruction for deleting noise data from the intraoral image. The memory 140 according to an embodiment may store one or more instruction for performing a method according to the present disclosure in order to delete noise data from the intraoral image.

The processor 150 controls an intended to be performed, by executing the at least one instruction stored in the memory 140. The at least one instruction may be stored in an internal memory included in the processor 150 or in the memory 140 included in a data processing device separately from the processor.

In detail, the processor 150 may control at least one component included in the data processing device so that an intended operation is performed, by executing the at least one instruction. Accordingly, even when a case in which the processor performs predetermined operations is explained as an example, this may mean that the processor controls at least one component included in the data processing device so that the predetermined operations are performed.

The processor 150 according to an embodiment may obtain 3D intraoral data, based on 2D image data obtained by scanning an oral cavity including teeth, by executing one or more instructions stored in the memory 140. The 3D intraoral data may be 3D surface data representing the shape of the surface of an object in a 3D manner, and may be in the form of a point cloud. By executing one or more instructions stored in the memory 140, the processor 150 may create a 3D intraoral image so that a scanned surface area and a rear surface area of the scanned surface area are distinguished from each other, based on based on the 3D intraoral data, and display the 3D intraoral image on a screen. The processor 150 may distinguish the scanned surface area from the rear surface area of the scanned surface area, based on the viewpoint of the screen and the direction vector of a point. The processor 150 may display the scanned surface in a first color mapped based on the obtained 3D data, and may display an unscanned surface in a second color.

By executing one or more instructions stored in the memory 140, the processor 150 may set a deletion area on the displayed intraoral image and delete a rear surface area included in the deletion area. When a noise data deletion function is selected, the processor 150 may control the display 130 to display an icon for selecting an area that is to be deleted. The processor 150 may select an area (deletion area) from which noise data is to be deleted, based on a user input for moving the displayed icon. By executing one or more instructions stored in the memory 140, the processor 150 may delete only a portion displayed in the second color from the selected area and may not delete a portion displayed in the first color. The portion displayed in the second color represents the unscanned surface (rear surface of the scanned surface). For example, the processor 150 may delete only the rear surface area of the scanned surface without deleting the scanned surface among surfaces included in the intraoral image.

By executing one or more instructions stored in the memory 140, the processor 150 may segment the intraoral image into a tooth area and a gingival area, and, when the gingival area is selected as an area from which noise data is to be deleted, may not delete a portion of the gingival area displayed in the second color (e.g., a gingival rear surface area). By executing one or more instructions stored in the memory 140, the processor 150 may delete a rear surface area (area displayed in a second color) spaced apart from the scanned surface area (area displayed in a first color) by a predetermined distance or more.

The processor 150 according to an example may be implemented as a type including at least one internal processor and a memory device (e.g., RAM, ROM, etc.) for storing at least one of programs, instructions, signals, and data which are to be processed or used by the internal processor.

The processor 150 may include a graphics processing unit (GPU) for graphic processing corresponding to video. The processor may be implemented as a system on chip (SoC) into which a core and a GPU are integrated. The processor may include multiple cores more than a single core. For example, the processor may include a dual-core, triple-core, quad-core, hexa-core, octa-core, deca-core, dodeca-core, hexadecimal core, and the like.

According to an embodiment, the processor 150 may create an intraoral image, based on a 2D image received from the intraoral scanner 10.

In detail, the communication interface 110 may receive data obtained by the intraoral scanner 10, for example, raw data obtained through intraoral scanning, under a control by the processor 150. The processor 150 may create a 3D intraoral image three-dimensionally representing the oral cavity, based on the raw data received from the communication interface 110. For example, the intraoral scanner 10 may include an L camera corresponding to a left field of view and an R camera corresponding to a right field of view in order to restore a 3D image according to an optical triangulation method. The L camera and the R camera of the intraoral scanner may obtain L image data corresponding to the left field of view and R image data corresponding to the right field of view, respectively. Then, the intraoral scanner may transmit raw data including the L image data and the R image data to the communication interface 110 of the intraoral image processing apparatus 100.

Thereafter, the communication interface 110 may transmit the received raw data to the processor 150. The processor 150 may create an intraoral image three-dimensionally representing the oral cavity, based on the received raw data.

The processor 150 may control the communication interface 110 to directly receive an intraoral image representing the oral cavity in a 3D manner from an external server, a medical device, or the like. In this case, the processor may obtain a 3D intraoral image without creating a 3D intraoral image based on the raw data.

According to an embodiment, the processor 150 performing operations such as 'extraction', 'obtainment', and 'creation' may include not only a case where the processor 150 directly performs the above-described operations by executing at least one instruction, but also the processor 150 controlling other components so that the above-described operations are performed.

In order to implement the disclosed embodiments, the intraoral image processing apparatus 100 may include only some of the components shown in FIG. 7 or may include more components than the components shown in FIG. 7.

The intraoral image processing apparatus 100 may store and execute dedicated software linked to an intraoral scanner. The dedicated software may be referred to as a dedicated program, a dedicated tool, or a dedicated application. When the intraoral image processing apparatus 100 operates in conjunction with the intraoral scanner 10, the dedicated software stored in the intraoral image processing apparatus 100 may be connected to the intraoral scanner 10 to receive, in real time, data obtained through intraoral scanning. For example, there is dedicated software for processing data obtained through intraoral scanning by Medit's i500 intraoral scanner. In detail, Medit produces and distributes 'Medit Link', which is software for processing, managing, using, and/or transmitting data obtained by an intraoral scanner (e.g., i500). Because 'dedicated software' refers to a program, tool, or application operable in conjunction with an intraoral scanner, various intraoral scanners developed and sold by various manufacturers may be used in common. The above-described dedicated software may be produced and distributed separately from an intraoral scanner that performs intraoral scanning.

The intraoral image processing apparatus 100 may store and execute dedicated software corresponding to the i500 product. The dedicated software may perform one or more operations for obtaining, processing, storing, and/or transmitting the intraoral image. The dedicated software may be stored in a processor. The dedicated software may provide a user interface for use of the data obtained by the intraoral scanner. A user interface screen provided by the dedicated software may include an intraoral image created according to an embodiment.

An intraoral image processing method according to an embodiment of the disclosure may be embodied as program commands executable by various computer means and may be recorded on a computer-readable recording medium. An embodiment of the disclosure may be a computer-readable storage medium having recorded thereon at least one program including at least one instruction which executes the intraoral image processing method.

The computer-readable storage medium may include program commands, data files, data structures, and the like separately or in combinations. Examples of the computer-readable storage medium may include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device configured to store and execute program commands such as a ROM, a random-access memory (RAM), or a flash memory.

A machine-readable storage medium may be provided as a non-transitory storage medium. The non-transitory storage medium may refer to a tangible storage medium. The non-transitory storage medium may include a buffer in which data is temporarily stored.

According to an embodiment, intraoral image processing methods according to various disclosed embodiments may be provided by being included in a computer program product. The computer program product may be distributed in the form of a machine-readable storage medium (e.g., compact disc read only memory (CD-ROM)). Alternatively, the computer program product may be directly distributed (e.g., downloaded or uploaded) online via an application store (e.g., Play Store™) or between two user devices (e.g., smartphones). In detail, a computer program product according to an embodiment may include a storage medium on which a program including at least one instruction is recorded to perform an intraoral image processing method according to an embodiment.

While one or more embodiments of the disclosure have been described with reference to the figures, it will be understood by those of ordinary skill in the art that various changes in form and details may be made therein without departing from the spirit and scope as defined by the following claims.

The invention claimed is:

1. An intraoral image processing method comprising:
   obtaining three-dimensional (3D) intraoral data of a scanned object, wherein the 3D intraoral data comprises a plurality of points;
   creating a 3D intraoral image including a scanned surface area and a rear surface area of the scanned surface area, based on the 3D intraoral data; and
   deleting at least a portion of the rear surface area,
   wherein the deleting of the at least a portion of the rear surface comprises, based on an angle between a direction vector of vertex data of a first area included in the rear surface area and a normal vector of a virtual reference surface being in a preset range, deleting the first area.

2. The intraoral image processing method of claim 1, wherein the deleting of the at least a portion of the rear surface further comprises:
   changing the virtual reference surface by a preset direction; and
   based on an angle between a direction vector of vertex data of a second area included in the rear surface area and the normal vector of the virtual reference surface being in a preset range, deleting the second area.

3. The intraoral image processing method of claim 1, wherein the preset range is no less than 90 degrees to no less than 180 degrees.

4. The intraoral image processing method of claim 1, further comprising displaying the 3D intraoral image on a screen,
wherein the displaying of the 3D intraoral image on the screen comprises displaying the 3D intraoral image on the screen based on at least one of a viewpoint indicating a direction in which the 3D intraoral image is observed and a screen on which the 3D intraoral image is projected in a two-dimensional (2D) manner.

5. The intraoral image processing method of claim 4, further comprising setting a deletion area on the 3D intraoral image,
wherein the displaying of the 3D intraoral image on the screen comprises, based on an angle between a direction vector of vertex data of a second area in the 3D intraoral image and a normal vector of the screen being in the preset range, displaying the second area as the rear surface area, and
the deleting of the at least a portion of the rear surface area comprises deleting the rear surface area included in the deleted area.

6. The intraoral image processing method of claim 5, further comprising displaying at least one of an item corresponding to a deletion function and an icon for selecting the deletion area.

7. The intraoral image processing method of claim 6, wherein the displaying of the item corresponding to the deletion function and the icon for selecting the deletion area comprises:
in response to a user input of selecting the item corresponding to the deletion function, displaying the icon for selecting the deletion area; and
displaying at least one size setting icon for setting the size of the icon for selecting the deletion area.

8. The intraoral image processing method of claim 6, wherein the setting of the deletion area on the 3D intraoral image comprises:
receiving a user input of moving the icon for selecting the deletion area; and
setting, as the deletion area, an area which the icon for selecting the deletion area has passed.

9. The intraoral image processing method of claim 4, wherein the displaying of the 3D intraoral image on the screen comprises displaying the scanned surface area in a first color and displaying the rear surface area in a second color that is distinct from the first color.

10. The intraoral image processing method of claim 4, wherein the displaying of the 3D intraoral image on the screen comprises:
determining a texture of the scanned surface area, based on the 3D intraoral data; and
displaying the scanned surface area to have the determined texture.

11. The intraoral image processing method of claim 4, wherein the deleting of the at least a portion of the rear surface area further comprises deleting at least a portion of the rear surface area spaced apart from the scanned surface area.

12. The intraoral image processing method of claim 1, further comprising segmenting the intraoral image into a tooth area and a gingival area,
wherein the deleting of the at least a portion of the rear surface area comprises deleting at least a portion of the rear surface area included in the tooth area and not deleting at least a portion of the rear surface area included in the gingival area.

13. An intraoral image processing apparatus comprising:
a display;
a memory storing one or more instructions; and
a processor,
wherein the processor executes the one or more instructions stored in the memory to:
obtain three-dimensional (3D) intraoral data of a scanned object, wherein the 3D intraoral data comprises a plurality of points;
create a 3D intraoral image including a scanned surface area and a rear surface area of the scanned surface area, based on the 3D intraoral data; and
delete at least a portion of the rear surface area,
wherein the processor is further configured to execute the one or more instructions in the memory to delete the first area, based on an angle between a direction vector of vertex data of a first area included in the rear surface area and a normal vector of a virtual reference surface being in a preset range.

14. The intraoral image processing apparatus of claim 13, wherein the processor is further configured to execute the one or more instructions in the memory to change the virtual reference surface by a preset direction, and, delete the second area based on an angle between a direction vector of vertex data of a second area included in the rear surface area and a normal vector of a changed virtual reference surface being in a preset range.

15. The intraoral image processing apparatus of claim 13, wherein the preset range is no less than 90 degrees to no less than 180 degrees.

16. The intraoral image processing apparatus of claim 13, wherein the processor is further configured to execute the one or more instructions in the memory to control the display to display the 3D intraoral image on the screen, based on at least one of a viewpoint indicating a direction in which the 3D intraoral image is observed and a screen on which the 3D intraoral image is projected in a two-dimensional (2D) manner.

17. The intraoral image processing apparatus of claim 16, wherein
the processor is further configured to execute the one or more instructions in the memory to set a deletion area on the 3D intraoral image, control the display to display the second area as the rear surface area, based on an angle between a direction vector of vertex data of the second area in the 3D intraoral image and a normal vector of the screen being in the preset range, and delete the rear surface area included in the deletion area.

18. A non-transitory computer-readable recording medium having recorded thereon a program including at least one instruction which, when executed by a computer, performs an intraoral image processing method, the intraoral image processing method comprising:
obtaining three-dimensional (3D) intraoral data of a scanned object, wherein the 3D intraoral data comprises a plurality of points;
creating a 3D intraoral image including a scanned surface area and a rear surface area of the scanned surface area based on the 3D intraoral data; and
deleting at least a portion of the rear surface area, wherein the deleting of the at least a portion of the rear surface comprises, based on an angle between a direction vector of vertex data of a first area included in the rear surface area and a normal vector of a virtual reference surface being in a preset range, deleting the first area.

* * * * *